United States Patent
Saitou

(10) Patent No.: US 7,260,288 B2
(45) Date of Patent: Aug. 21, 2007

(54) OPTICAL WAVE GUIDE ELEMENT, AND MANUFACTURE THEREFOR

(75) Inventor: Tsutomu Saitou, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 15 days.

(21) Appl. No.: 10/674,956

(22) Filed: Sep. 30, 2003

(65) Prior Publication Data

US 2004/0223690 A1 Nov. 11, 2004

(30) Foreign Application Priority Data

Sep. 30, 2002 (JP) ............................. 2002-285721

(51) Int. Cl.
*G02B 6/26* (2006.01)
*G02B 6/34* (2006.01)
(52) U.S. Cl. .......................................... 385/31; 385/36
(58) Field of Classification Search .................. 385/31
See application file for complete search history.

(56) References Cited

U.S. PATENT DOCUMENTS

| | | | |
|---|---|---|---|
| 3,791,715 A * | 2/1974 | Lean et al. | 385/31 |
| 3,905,676 A * | 9/1975 | Ulrich | 385/36 |
| 5,259,044 A | 11/1993 | Isono et al. | |
| 6,320,996 B1 * | 11/2001 | Scobey et al. | 385/18 |
| 6,513,390 B1 * | 2/2003 | De La Puente et al. | 73/800 |
| 6,529,543 B1 * | 3/2003 | Anderson et al. | 372/108 |

FOREIGN PATENT DOCUMENTS

| | | |
|---|---|---|
| JP | 02-217808 | 8/1990 |
| JP | 02-240607 | 9/1990 |
| JP | 04-024610 | 1/1992 |
| JP | 04-311918 | 11/1992 |
| JP | 05-034650 | 2/1993 |
| JP | 06-003540 | 1/1994 |
| JP | 06-008912 | 2/1994 |
| JP | 07-294781 | 11/1995 |
| JP | 2001-183540 | 7/2001 |
| JP | 2001-195771 | 7/2001 |
| JP | 2001-242338 | 9/2001 |
| JP | 2002-023004 | 1/2002 |
| JP | 2004-271681 | 9/2004 |

* cited by examiner

*Primary Examiner*—Frank Font
*Assistant Examiner*—Eric Wong
(74) *Attorney, Agent, or Firm*—Chapman and Cutler LLP

(57) ABSTRACT

An object of the present invention is to provide an optical wave guide element for making the miniaturization of the entire device including the optical wave guide element possible, by connecting optical fiber for incoming and outgoing radiation to the optical wave guide element, so that the optical wave guide element and the optical fiber are positioned at an angle of 90°, as well as to provide a manufacturing method for the same.

14 Claims, 4 Drawing Sheets

OPTICAL WAVE GUIDE ELEMENT, AND MANUFACTURE THEREFOR

BACKGROUND OF THE INVENTION (1) Field of the Invention

The present invention relates to an optical wave guide element wherein an optical wave guide is formed on a substrate having the electro-optic effect and the manufacture of the same, in particular, to an optical wave guide element characterized by the connection structure of a substrate having the electro-optic effect to optical fiber and the manufacture of the same.

(2) Related Art Statement

A dense wavelength division multiplexing (DWDM) technology has been developed for optical communication systems corresponding to an increase in the demand for high speed, large capacity data communication systems in recent years. As a result, it becomes necessary to utilize the systems by combining a great number of optical wave guide elements, such as optical modulators, and in particular, miniaturization of the bodies of these optical wave guide elements and the connection structures of the bodies to optical fiber is required for making the entirety compact, so as to prevent the entire device from increasing in size.

An optical wave guide, within an optical wave guide element that forms an optical modulator, and optical fiber, for incoming and outgoing radiation connected to the optical wave guide, are aligned in an optical modulator module (which is formed of a metal case containing the body of an optical modulator and parts attached to this, for easy handling) according to the prior art. As a result, in the case where the optical modulator module is contained in the device box, as shown in FIG. 1, the shortest possible length of the system is the sum of the minimum curvature length (section R of FIG. 1) of optical fiber 3 extending from the case of optical modulator module 1 and the length L of the case (strictly speaking, lengths $l_1$ and $l_2$ of support members 4 and 5, for supporting optical fiber extending from the case, should also be added to the above sum).

As a result, in order to reduce the length of the system containing the optical modulator module, as shown in FIG. 2, it becomes necessary to arbitrarily set the angle between optical fiber for incoming radiation and optical fiber for outgoing radiation which extend from the optical modulator module so that the system can be bent 90°, for example, eliminating the minimum curvature length (section R) of the optical fiber.

Here, 6, shown in FIGS. 1 and 2, indicates terminals which allow the input of a signal voltage of a microwave and the output of a detection signal from a light receiving element contained in optical modulator module 1. In addition, in order to reduce optical loss in the connection between the optical modulator and the optical fiber, as shown in FIGS. 1 and 2, the connection between the optical modulator and the optical fiber has an inclination of approximately 2°.

As shown in FIG. 2, in order to bend the optical fiber for incoming radiation 90°, (1) a method for bending the optical fiber 90° within the case of optical modulator module 1 (Japanese Unexamined Patent Publication H7(1995)-294781), (2) a method for bending the optical axis of incoming light into or outgoing light from the optical wave guide element 90° by using a reflective member such as a prism (Japanese Unexamined Patent Publication 2001-242338), and the like, have been proposed.

When method (1) is used, however, it becomes necessary to additionally secure a space to contain the optical fiber that has been bent 90° inside the case, causing the length L' of the case to be extended. Furthermore, when method (2) is used, the length L' of the case becomes long in the same manner as in method (1) in order to secure the space for containing the reflective member, and in addition, the manufacturing process becomes complicated because the optical positions must be adjusted and, therefore, method (2) is defective in that manufacturing becomes difficult.

An object of the present invention is to solve the above described problem, and to provide an optical wave guide element for making the miniaturization of the entire device including the optical wave guide element possible, by connecting optical fiber for incoming and outgoing radiation to the optical wave guide element, so that the optical wave guide element and the optical fiber are positioned at an angle of approximately 90°, as well as to provide a manufacturing method for the same.

SUMMARY OF THE INVENTION

In order to solve the above described problems, the invention according to claim 1 provides an optical wave guide element having a substrate which has the electro-optic effect and an optical wave guide formed on the substrate, characterized by comprising: a reflective means formed on a side of the substrate where an end of the optical wave guide is positioned; and optical fiber connected to the substrate which is placed apart from the optical wave guide, wherein light waves that propagate between the reflective means and the optical fiber propagate within the substrate excluding the optical wave guide.

The invention according to claim 1 is provided with a reflective means on a side of the substrate where the optical wave guide is formed, so that the light reflected from this reflective means, or the light that enters the reflective means propagates through the substrate which is optically coupled with optical fiber. As a result, a reflective member, such as a prism, is not required to bend the optical axis 90°, unlike the prior art, and it becomes possible to achieve the miniaturization of the optical wave guide element in a simple configuration where optical fiber is simply connected to the substrate.

In addition, the invention according to claim 2 provides the optical wave guide element according to claim 1, characterized in that the optical fiber is connected to a side of the substrate where the reflective means is not formed, or to bottom surface of the substrate.

The invention according to claim 2 allows the light reflected from the reflective means, or the light that enters the reflective means, to propagate through the substrate and therefore, a side, or the bottom surface of the substrate, can be utilized for the connection of the optical fiber to the substrate, significantly increasing the freedom of the design of the entire device that includes the optical wave guide element.

In addition, the invention according to claim 3 provides the optical wave guide element according to claim 1 or 2, characterized in that the propagation distance of light waves, which propagate inside the substrate excluding the optical wave guide, is 200 µm or less.

The invention according to claim 3 makes it possible to limit the loss of light waves in the optical coupling between the optical wave guide and the optical fiber to 3 dB or less by limiting the propagation distance of light waves, which propagate through the substrate excluding the optical wave guide, to 200 μm or less. In particular, it also becomes possible to limit this loss to 1 dB or less by limiting the propagation distance to 100 μm or less.

In addition, the invention according to claim 4 provides the optical wave guide element according to any of claims 1 to 3, characterized in that the angle formed between the normal direction of the reflective means and the optical axis of the optical wave guide that makes contact with the reflective means is no smaller than the angle of the total reflection of the light waves that are transmitted through the optical wave guide.

The invention according to claim 4 allows the reflection of light waves from the reflective means to be the total reflection and therefore, the loss in the amount of light waves can be limited, making it possible to achieve a more effective light propagation.

In addition, the invention according to claim 5 provides the optical wave guide element according to any of claims 1 to 4, characterized in that the reflective means has a reflective film.

The invention according to claim 5 provides a reflective film to the reflective means and thereby, it becomes possible to enhance the reflection efficiency of light waves, and the freedom of setting the angle of the reflective means relative to the substrate is increased, making it easy to design the device.

In addition, the invention according to claim 6 provides the optical wave guide element according to any of claims 1 to 3, characterized in that the reflective means separates the light waves transmitted from the optical wave guide side into transmitted light and reflected light so that the transmitted light is made to enter a light receiving element provided outside the substrate.

The invention according to claim 6 separates the light waves exiting from the optical wave guide into transmitted light and reflected light by means of the reflective means and therefore, it becomes possible to easily monitor the output light of an optical wave guide element, such as an optical modulator, simply by placing a light receiving element on the optical axis of the transmitted light.

In addition, the invention according to claim 7 provides a manufacture for the optical wave guide element according to any of claims 1 to 6, characterized in that the position where the substrate and the optical fiber are connected is determined while the light intensity of the light waves that propagate through the substrate excluding the optical wave guide is being detected.

The invention according to claim 7 determines the position where the substrate and the optical fiber are connected while detecting the light intensity of the light waves that propagate through the substrate and therefore, it becomes possible to enhance the efficiency of the optical coupling between the two members, making it possible to provide an optical wave guide element with a small optical loss.

Furthermore, in the case where a wave guide is provided between the above described reflective means and the optical fiber, adjusting the angle between the reflective means and this wave guide is extremely difficult, causing an increase in the loss of the light waves that propagate through the wave guide. The present invention prevents such a wave guide from being formed and therefore, manufacturing the optical wave guide element is easy, and it is possible to restrict an increase in the loss of light waves.

EXPLANATIONS OF NUMERALS

Figure 1:
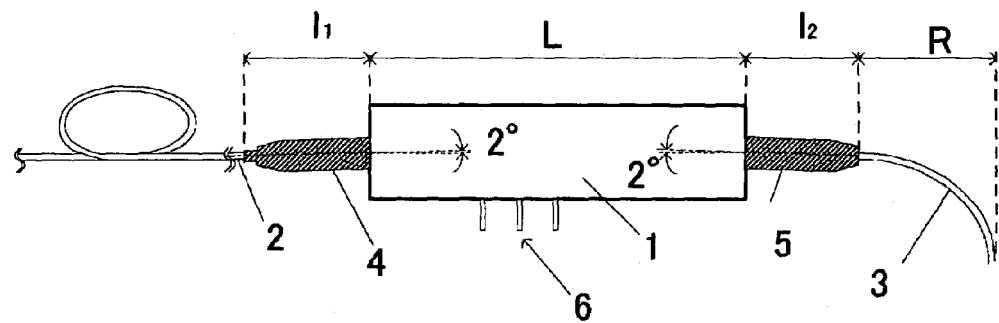
FIG. 1 is a diagram showing the structure of an optical modulator module according to the prior art.
Figure 2:
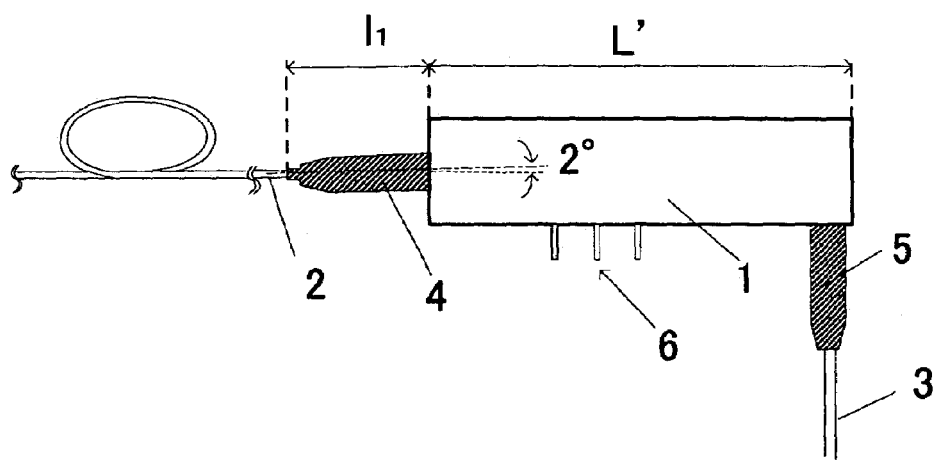
FIG. 2 is a diagram showing the structure of an optical modulator module according to the present invention.

1 Optical modulator module
2, 3, 13 Optical fiber
10 Optical wave guide element chip
11 Optical wave guide
12 Reflective means
16, 17, 18 Reinforcing member

DETAILED DESCRIPTION OF THE INVENTION

In the following, the preferred embodiments of the present invention are described in detail.

Here, though an optical modulator is illustrated as an optical wave guide element in the following embodiments, the present invention is not limited to the optical modulator, but rather, it is possible to apply the present invention to an electric field sensor element, or the like, for an optical electric field sensor system. In addition, the optical modulator module is not limited to containing only an optical wave guide element, but rather, it is possible for the module to also contain a light source, such as a semiconductor laser, and a variety of optical parts or electronic parts, such as a light receiving element.

The substrate where the optical wave guide element is formed is made of a material having the electro-optic effect, such as lithium niobate ($LiNbO_3$; hereinafter referred to as LN), lithium tantalite ($LiTaO_3$), PLZT (lead lanthanum zirconate titanate) or a quartz-based material. In particular, it is preferable to use an $LiNbO_3$ crystal, an $LiTaO_3$ crystal, or a solid solution crystal made of $LiNbO_3$ and $LiTaO_3$ due to the fact that an optical wave guide device can be easily formed of any of these crystals which have a large anisotropy. The present embodiment primarily refers to an example using lithium niobate (LN).

A method for forming an optical wave guide by thermally diffusing Ti in an LN substrate, and subsequently forming an electrode directly on the LN substrate without providing a buffer layer over a portion or the entirety of the substrate, and a method for forming an electrode that makes indirect contact with the substrate by providing a buffer layer, such as $SiO_2$ which is dielectric, on an LN substrate in order to reduce the propagation loss of light in the optical wave guide and furthermore, forming a modulating electrode and a grounding electrode having thicknesses of several tens of μm on top of the buffer layer according to the formation of a Ti.Au electrode pattern, and according to a gold plating method or the like, are cited as methods for manufacturing an optical wave guide element. In general, a plurality of optical wave guide elements is fabricated on one LN wafer, which is cut into individual optical wave guide element chips at the last stage and thereby, optical wave guide element chips are manufactured.

An optical wave guide element chip is conventionally utilized in a module. Concretely speaking, the optical wave guide element chip is contained in a metal case, and optical fibers for the input and output of light waves, and leads for the electrical connection to signal electrodes and the like, are respectively extended from the body of the optical wave guide element chip to the outside of the metal case.

Figure 3:
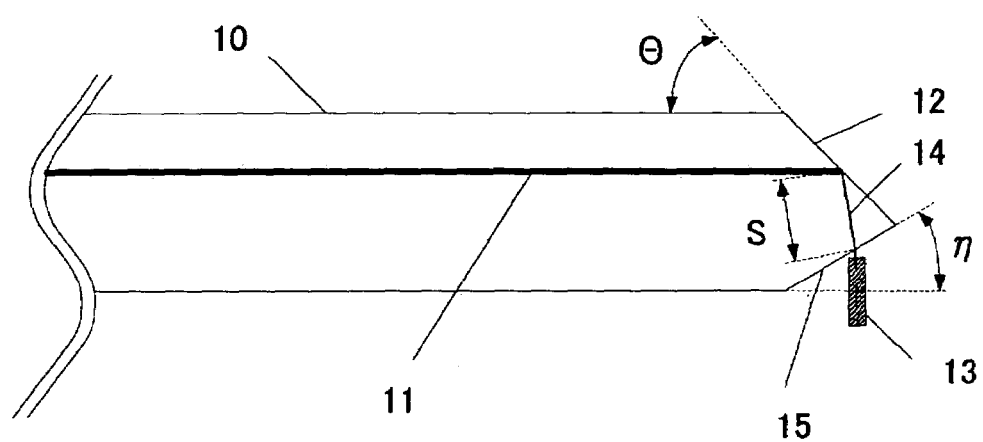
FIG. 3 is a diagram showing the connection between an optical wave guide element chip and optical fiber according to the present invention.

FIG. 3 is a diagram showing the connection between an optical wave guide element chip 10 and optical fiber 13 which characterizes the present invention.

An optical wave guide 11 is formed on the surface of chip 10 and a reflective surface 12, which is a reflective means, is provided on a side of the chip substrate.

This reflective surface is formed so that the efficiency of the reflection of the light waves propagating through optical wave guide 11 is increased by polishing the reflective surface until it becomes a mirror surface. In addition, it is also possible to provide a reflective film made of metal, or a reflective film which is a multilayered film made of dielectrics, on the reflective surface.

Furthermore, angle Θ formed between optical wave guide 11 and reflective surface 12 (angle Θ has a value gained by subtracting the angle of incidence of the light waves from 90° concerning the light waves that enter the reflective surface from the optical wave guide) is set so that the angle of incidence of the light waves becomes that of the total reflection and thereby, it becomes possible to restrict the light waves from being transmitted through reflective surface 12 to the outside of the chip, and to reduce the loss of the light propagation.

Here, in the case where light waves 14 propagating through the substrate, excluding the below described optical wave guide, enters reflective surface 12, the same effects can be expected by forming the substrate so that the angle of incidence of light waves 14 entering reflective surface 12 becomes that for the total reflection.

In addition, light waves 14 reflected from reflective surface 12 (In the case where optical fiber 13 is for incoming radiation, light waves 14 enter reflective surface 12. The following description primarily refers to a case where light waves exit optical wave guide 11 and enter optical fiber 13 in order for the content to be easily understood.) propagate through the substrate where an optical wave guide is not formed and exit from another side 15 of the substrate so as to enter optical fiber 13.

Angle η formed between side 15 of the substrate and optical wave guide 11, which is the angle formed between light waves 14 that have exited to the outside of the substrate and optical wave guide 11, is set at approximately 90°.

Next, an appropriate value of propagation distance S of light waves that propagate inside the substrate is described.

In the case where the light beam, having a beam diameter of $w_1$ and a wavelength of $\lambda$, propagates through a medium having a refraction index of n by a distance of l, the diameter $w_2$ of the beam after the propagation is represented by the following equation.

$$w_2 = w_1 \times (1 + (\lambda \cdot l/(n\pi w_1^2))^2)^{1/2} \quad (1)$$

In addition, the condition where light waves are coupled via a reflective means like in the present invention is considered to be achieved in the two coupled wave guides $w_3$ and $w_4$, having different diameters of the propagation modes of light waves, and efficiency A of coupling at this time is represented by the following equation, in the case where the condition is presumed to be an ideal condition having no shifts in the optical axis or in the angle.

$$A = 4/(w_3/w_4 + w_4/w_3)^2 \quad (2)$$

In the case wherein an LN substrate is presumed to be utilized as a substrate having the electro-optic effect, n=2.15, $w_1$=9 μm (the diameter of the light mode of WG) and λ=1550 nm are substituted into equations (1) and (2) so that $w_2$ and efficiency A of coupling vis-à-vis the optical fiber are found in the cases of l=0.05, 0.1, 0.15, 0.2, 0.25 and 0.3. Here, the diameter of the light mode in the optical fiber is 10 μm.

The results of calculations in the respective conditions are shown in Table 1.

TABLE 1

Efficiency of Coupling of Optical Beam According to Present Invention

| l (mm) | $w_2$ (μm) | coupling efficiency A | coupling loss (dB) |
|---|---|---|---|
| 0.05 | 10.34 | 0.998 | −0.0087 |
| 0.1 | 13.60 | 0.911 | −0.4 |
| 0.15 | 17.75 | 0.732 | −1.35 |
| 0.2 | 22.23 | 0.558 | −2.53 |
| 0.25 | 27.04 | 0.423 | −3.73 |
| 0.3 | 31.89 | 0.326 | −4.86 |

Judging from the results of Table 1, the coupling loss can be limited to 3 dB or less in the case where propagation distance S of light waves is 0.2 mm or less, and more preferably, it becomes possible to limit the coupling loss to 1 dB or less by setting the propagation distance at 0.1 mm or less. In addition, propagation distance S, that makes the coupling loss 1 dB, is approximately 135 μm.

The present invention is characterized in that the spread of the light beam diameter is restricted to a certain extent, even in the case where light waves propagate approximately 100 μm within the substrate. The propagation of a light beam in the air conventionally results in a $w_2$ of 23.7 μm and a coupling loss of −2.92 dB for a propagation distance of 0.1 mm in the same conditions as described above. In the same manner, in the case where the propagation distance is 0.2 mm, $w_2$ becomes 44.77 μm and the coupling loss becomes −7.45 dB.

Accordingly, it is necessary to set the propagation distance between the optical wave guide and the optical fiber at less than 0.1 mm in the conventional configuration, wherein light waves are emitted once into the air from the optical wave guide so as to enter the optical fiber via a prism, or the like. Practically, such a configuration is difficult to achieve, and an image formation member such as a lens is additionally required.

In contrast with this, in the case where light waves propagate within the substrate like in the present invention, it is possible to directly connect optical fiber to side 15 of the substrate, as shown in FIG. 3, and it is also possible to easily secure propagation distance S at 200 μm or less in the configuration by adjusting the positions where the substrate is cut to create sides 12 and 15.

According to the present invention, wave guide 11 and optical fiber 13 form an angle of 90° and therefore, when Θ is determined, η is automatically found.

Many combinations of Θ and η exist that make light totally reflect at 14, and that make wave guide 11 and optical fiber 13 form an angle of 90°, including an example where Θ=41° and η=23.78°.

At this time of alignment, the distance between the LN substrate and the optical fiber (the special distance between the LN substrate and the optical fiber) becomes 27.54 μm. In order to shorten this distance, η should be reduced, and the distance between the LN substrate and the optical fiber becomes 7.7 μm when η=7.04° (at this time, Θ becomes 43.85°).

The shorter the distance between the LN substrate and the optical fiber is, the more the loss in the modulator can be reduced. However, processing becomes more difficult when η is reduced and therefore, the values of Θ and η are determined by offsetting the loss in the modulator with the yield.

Figure 4:
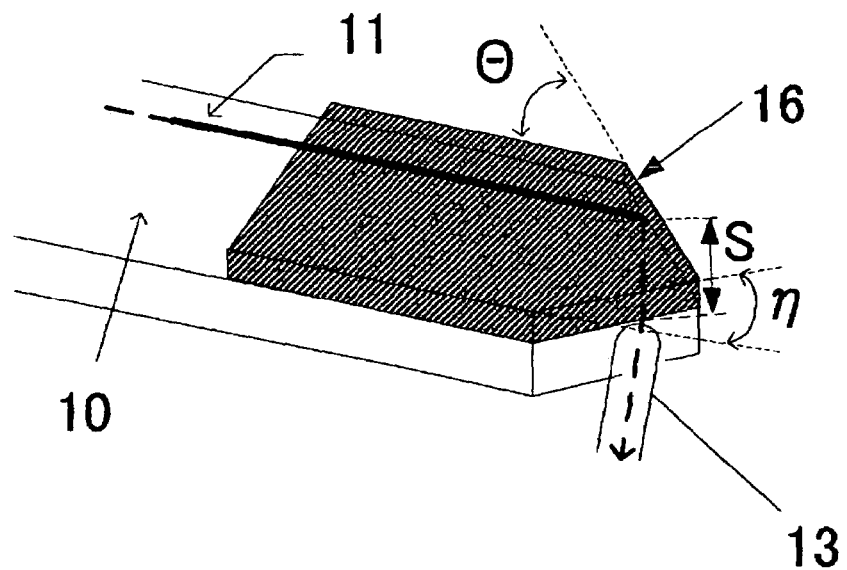
FIG. 4 is a perspective diagram showing the connection between the optical wave guide element chip and the optical fiber according to the present invention.

FIG. 4 is a diagonal diameter showing an optical wave guide element according to the present invention, and the same numerals used in FIGS. 3 and 4 indicate the same parts.

A reinforcing member is usually used in order to increase the strength of adhesion at the time when fiber is adhered to an LN substrate. A reinforcing member 16 provided on an LN substrate, as shown in FIG. 4, and a reinforcing member 17 for supporting fiber, as shown in FIG. 6, are cited as examples of the reinforcing member.

Figure 6:
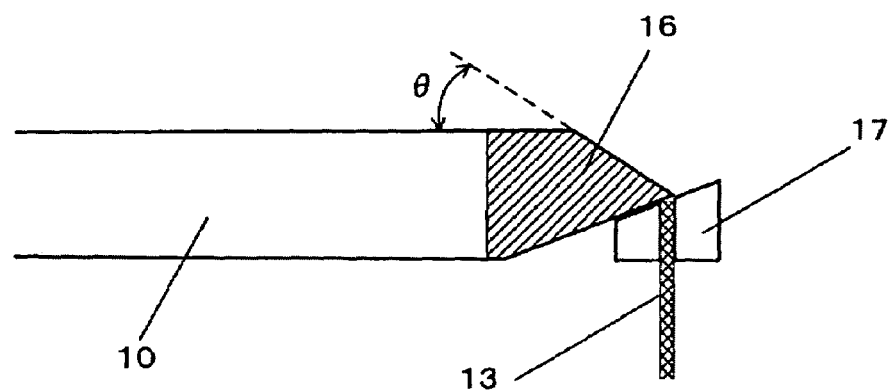
FIG. 6 is a diagram showing the connection between an optical wave guide element chip and optical fiber in the case where a reinforcing member of the optical fiber is used.

In addition, as shown in FIG. 6, in the case where an LN substrate and fiber are adhered to each other solely by means of reinforcing member 16 or 17, reinforcing member 17 protrudes from LN substrate 10, preventing an adequate effect from being achieved in some cases.

Figure 7:
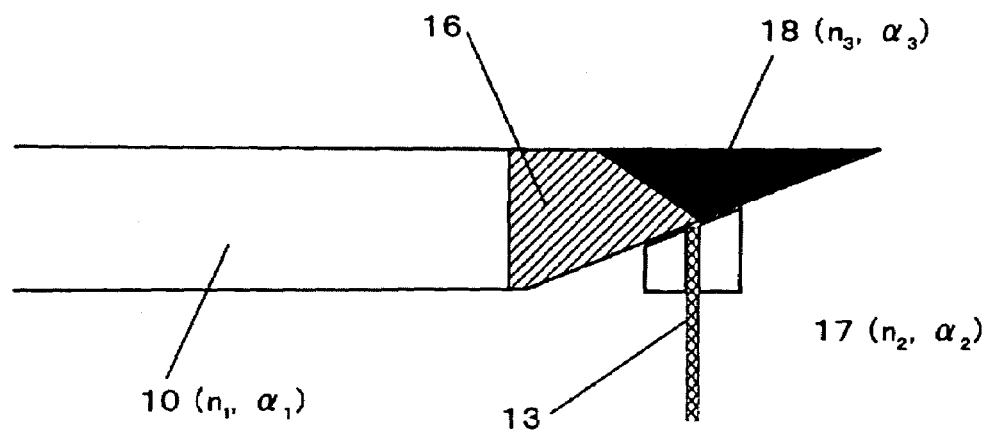
FIG. 7 is a diagram showing the connection between an optical wave guide element chip and optical fiber; in the case where a reinforcing member is used at an end of an LN substrate.

In such a case, as shown in FIG. 7, another reinforcing member 18 is connected to LN substrate 10, and after that, adhesion between the LN substrate and the fiber may be carried out using reinforcing member 17.

In the case where the refraction indices of the respective members, the LN substrate, reinforcing members 17 and 18, shown in FIG. 7, are denoted as $n_1$, $n_2$ and $n_3$, while the coefficients of thermal expansion of the respective members are likewise denoted as $\alpha_1$, $\alpha_2$ and $\alpha_3$, it is desirable for reinforcing member 18 to have refractive index $n_3$ that satisfies the condition $n_1 \sin(\pi/2 \cdot \theta) \geq n_3$, and to have coefficient $\alpha_3$ of thermal expansion that satisfies the condition $\alpha_1 \approx \alpha_3$.

With respect to reinforcing member 17, though it is not necessary for $n_2$ to be particularly limited, it is desirable for $\alpha_2$ to have approximately the same level of the coefficient of thermal expansion of optical fiber.

In addition, an appropriate shape of the end of optical fiber 13 is not necessarily the surface perpendicular to the optical axis, as shown in FIG. 3, but rather can be selected from among curvatures and inclined surfaces in accordance with the angle of connection to side 15 of the substrate.

Figure 5:
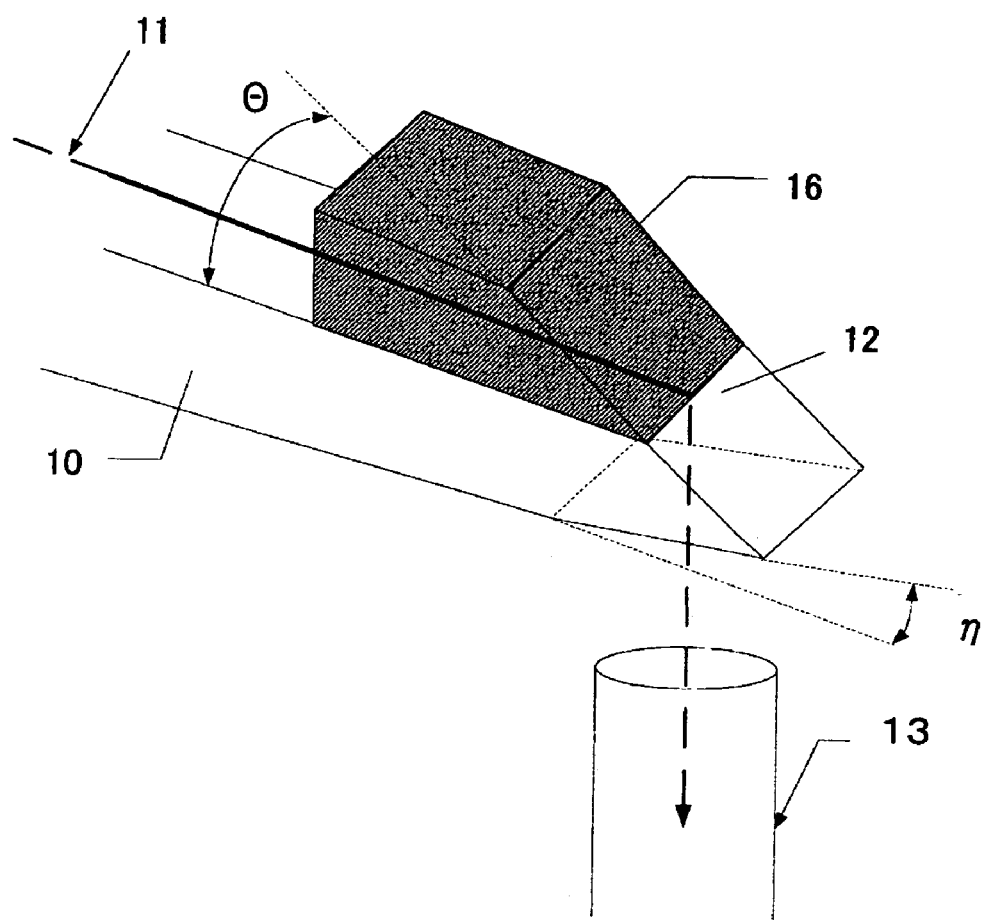
FIG. 5 is a diagram showing the connection between an optical wave guide element chip and optical fiber according to another embodiment of the present invention.

According to another embodiment, it is possible for the position of reflective means 12 in the configuration to be set so that light waves advance beneath the chip surface, as shown in FIG. 5. As a result of this, the positions of the chip and optical fiber can be set in various manners, increasing the freedom of designing the device.

It is possible to apply the present invention to the configuration wherein light waves are divided into transmitted light and reflected light by means of a reflective means, so that the transmitted light is made to enter a light receiving element which is additionally provided to monitor the amount of light waves.

In addition, it is preferable for chip 10 and optical fiber 13 to be connected to each other at the optimal position, where the amount of the received light is maximized as a result of monitoring the amount of light emitted from either end of the chip side, or the connected optical fiber side, when a light beam enters the other end at the time of connecting chip 10 to optical fiber 13. An adhesive having a high light transmittance, such as an ultra violet curing adhesive, can be used for this connection.

Here, the present invention is not limited to the above description, but rather, it is obviously possible to add extra components to the optical wave guide element according to a technology well known in the art.

As described above, in accordance with an optical wave guide element and a manufacturing method for the same according to the present invention, it becomes possible to miniaturize the entire device, including the optical wave guide element, by connecting optical fiber for incoming and outgoing radiation to the optical wave guide element, so that the optical wave guide element and the optical fiber are positioned in a manner forming an angle of approximately 90°.

The invention claimed is:

1. An optical wave guide element, comprising:
    a substrate which has electro-optic effect;
    an optical wave guide formed on the substrate;
    a reflective means formed on a side of the substrate where an incoming end of the optical wave guide is positioned;
    a transmission surface formed non-parallel to an input direction of the optical wave guide and apart from the optical wave guide; and
    an input optical fiber connected to the transmission surface,
    wherein the reflective means and the transmission surface are formed on the substrate so that a light wave exiting from the input optical fiber propagates within the substrate excluding the optical wave guide from the transmission surface toward the reflective means, and is reflected from the reflective means to enter the optical wave guide,
    an angle formed between an output direction of the input optical fiber and the input direction of the optical wave guide is set at approximately 90°, and
    the propagation distance of light waves that propagate inside the substrate excluding the optical wave guide, is 200 μm or less.

2. An optical wave guide element comprising:
    a substrate which has electro-optic effect;
    an optical wave guide formed on the substrate;
    a reflective means formed an a side of the substrate where an outgoing end of the optical wave guide is positioned;
    a transmission surface formed non-parallel to an output direction of the optical wave guide and apart from the optical wave guide; and
    an output optical fiber connected to the transmission surface,
    wherein the reflective means and the transmission surface are formed on the substrate so that a light wave exiting from the optical wave guide is directed toward the reflective means, from which the light wave is reflected, and propagates within the substrate excluding the optical wave guide to enter the output optical fiber through the transmission surface, an angle formed between the output direction of the optical wave guide and an input direction of the output optical fiber is set at approximately 90°, and the propagation distance of light waves that propagate inside the substrate excluding the optical wave guide, is 200 µm or less.

3. The optical wave guide element according to claim 1, wherein an angle formed between a normal direction of the reflective means and an optical axis of the optical wave guide that makes contact with the reflective means is no smaller than an angle of total reflection of light waves that are transmitted through the optical wave guide.

4. The optical wave guide element according to claim 1, wherein the reflective means comprises a reflective film.

5. The optical wave guide element according to claim 1, wherein the the transmission surface is formed on a side of the substrate where the reflective means is not formed, or on a bottom surface of the substrate.

6. The optical wave guide element according to claim 2, wherein the the transmission surface is formed on a side of the substrate where the reflective means is not formed, or on a bottom surface of the substrate.

7. The optical wave guide element according to claim 2, wherein an angle formed between a normal direction of the reflective means and an optical axis of the optical wave guide that makes contact with the reflective means is no smaller than an angle of total reflection of light waves that are transmitted through the optical wave guide.

8. The optical wave guide element according to claim 5, wherein an angle formed between a normal direction of the reflective means and an optical axis of the optical wave guide that makes contact with the reflective means is no smaller than an angle of total reflection of light waves that are transmitted through the optical wave guide.

9. The optical wave guide element according to claim 2, wherein the reflective means comprises a reflective film.

10. The optical wave guide element according to claim 5, wherein the reflective means comprises a reflective film.

11. The optical wave guide element according to claim 6, wherein the reflective means comprises a reflective film.

12. The optical wave guide element according to claim 2, wherein the reflective means separates light waves transmitted from the optical wave guide side into transmitted light and reflected light so that the transmitted light is made to enter a light receiving element provided outside the substrate.

13. The optical wave guide element according to claim 6, wherein the reflective means separates light waves transmitted from the optical wave guide side into transmitted light and reflected light so that the transmitted light is made to enter a light receiving element provided outside the substrate.

14. The optical wave guide element according to claim 6, wherein an angle formed between a normal direction of the reflective means and an optical axis of the optical wave guide that makes contact with the reflective means is no smaller than an angle of total reflection of light waves that are transmitted through the optical wave guide.

* * * * *